United States Patent [19]

McKinney

[11] Patent Number: 5,799,462
[45] Date of Patent: Sep. 1, 1998

[54] METHOD AND APPARATUS FOR LIGHTWEIGHT, INSULATED, STRUCTURAL BUILDING PANEL SYSTEMS

[75] Inventor: Craig B. McKinney, Glendora, Calif.

[73] Assignee: Craig McKinney, Glendora, Calif.

[21] Appl. No.: 675,243

[22] Filed: Jul. 2, 1996

[51] Int. Cl.⁶ .................................................. E04C 2/26
[52] U.S. Cl. .................. 52/742.13; 52/309.7; 52/591.4; 52/800.11; 29/897.32
[58] Field of Search ........................ 52/309.7, 742.13, 52/591.4, 800.11; 29/897.32

[56] References Cited

U.S. PATENT DOCUMENTS

| | | |
|---|---|---|
| 2,142,305 | 1/1939 | Davis . |
| 2,156,566 | 5/1939 | Kirschbraun . |
| 2,957,483 | 10/1960 | Dunn . |
| 3,042,967 | 7/1962 | Edberg . |
| 3,073,066 | 1/1963 | Edwards . |
| 3,112,163 | 11/1963 | Alderfer . |
| 3,300,931 | 1/1967 | Lutz .................................. 52/309.7 X |
| 3,484,331 | 12/1969 | Betz . |
| 3,556,918 | 1/1971 | Lemelson . |
| 3,714,747 | 2/1973 | Curran . |
| 3,833,454 | 9/1974 | Ambrose . |
| 4,094,110 | 6/1978 | Dickins . |
| 4,100,710 | 7/1978 | Kowallik . |
| 4,104,840 | 8/1978 | Heintz . |
| 4,123,885 | 11/1978 | Scott . |
| 4,144,296 | 3/1979 | Dickins . |
| 4,157,640 | 6/1979 | Joannes . |
| 4,177,615 | 12/1979 | Anderson . |
| 4,184,301 | 1/1980 | Anderson . |
| 4,195,459 | 4/1980 | Anderson . |
| 4,195,460 | 4/1980 | Anderson . |
| 4,196,554 | 4/1980 | Anderson . |
| 4,240,557 | 12/1980 | Dickins . |
| 4,241,555 | 12/1980 | Dickins . |
| 4,244,151 | 1/1981 | Seem . |
| 4,267,679 | 5/1981 | Thompson . |
| 4,284,447 | 8/1981 | Dickins . |
| 4,316,351 | 2/1982 | Ting . |
| 4,641,468 | 2/1987 | Slater .................................. 52/309.7 X |
| 4,653,718 | 3/1987 | Dickins . |
| 4,700,520 | 10/1987 | Ting . |
| 4,953,334 | 9/1990 | Dickins . |

Primary Examiner—Christopher Kent

[57] ABSTRACT

A method of manufacturing composite structural building panels for floors, walls and roofs with the components for securing adjacent panels to each other built into the interior of each panel and serving as a structural component and an optional interlocking component at the same time. The panels attain extreme values of structural integrity, insulation, sound attenuation, air/vapor impermeability and moisture resistance. The panels are non out gassing while having a zero flame spread and are virtually free from deterioration while remaining lightweight and economical. By insertion of optional strut members during manufacturing, the resulting structural values of the panel is drastically increased. The panels are composed of two offset and opposing face frames that each separately lock together within themselves by temporary frictional engagement or puncture crimp. Both face frames are then permanently locked together as a completed composite panel by an injected in-fill core of expandable polystyrene while creating a substantial interior thermal break between the two face frames. Panels are assembled at the site of construction and joined at the tops, bottoms, and further most ends as well as at door and window openings with channel most commonly known as "track" which in turn is mounted to a footing or foundation. A vast variety of interior and exterior surfaces can be applied directly over the panels. The resulting panels can span and reach greater distances and heights while holding drastically higher shear and diaphragm values as well as significantly higher structural live, dead, wind and snow loads.

5 Claims, 10 Drawing Sheets

METHOD AND APPARATUS FOR LIGHTWEIGHT, INSULATED, STRUCTURAL BUILDING PANEL SYSTEMS

BACKGROUND OF INVENTION

1. Field of Invention

This invention concerns the method of manufacturing a low cost composite infill insulated, sound attenuated, and structurally rated building panel systems for walls, floors, and roofs with an incorporated fastening component for adjacent panel attachments and attachments to pre-existing structures and a method of increasing the structural values of the panel systems by adding optional strut members at the interior side of the primary strut members. These panels are useful as a superior alternative building material that is economical to manufacture and for the builder and user. These systems are assembled and completed on site in a fraction of the time and costs needed for conventional steel and wood systems while maintaining precision dimensional stability and eliminates the need for highly skilled labor.

2. Prior Art

A variety of panels have been developed for use in the building industry. Most common is the sandwich panel with the use of plywood or sheet metal covering a plastic core all attempting to maintain thermal efficiency but lack the structural integrity required in the building industry. See for example U.S. Pat. Nos. 4,184,301 (Anderson) and 4,953, 334; 4,284,447; 4,241,555 (Dickens).

When the DICKENS panels are manufactured, a time consuming, cumbersome, and costly heat actuated chemical adhesive is applied to the surface of numerous thin strips of metal prior to being individually and laboriously inserted into a injection mold. These flat strips of metal are held in place by a costly series of magnets embedded in the interior surface of the injection mold. Two cycles of injection and expansion of expandable polystyrene is conducted. The resulting panel has flanges or tabs that extend beyond the panel frame and core to later overlap on one side of the exposed surface of an adjoining panel for a connection using numerous small sheet metal screws. These strips of metal are primarily used to protect the edges of the core while the extended flanges serve as an external and weak connection fastening plate. These plates are often damaged and pose a danger to personnel from being severely cut and also create a shipping and handling problem by being oversized for common shipping practices. The heat actuated chemical adhesive also raises problems in use by the governing EPA (Environmental Protection Agency). The structural values of the DICKINS prior art are very limited and the resulting panel serves as only an insulating panel.

SUMMARY OF INVENTION

The present invention constitutes a more rapid and less costly improvement in manufacturing building panels and produces superior panels with drastically higher structural ratings and incorporates a firm and positive fastening system. There is a single mode of injection and heat expansion of the infill core of expandable polystyrene beads (EPS). The structural components are a duality of offset and facing frames that are each composed of strut and channel members of such configurations so as to friction lock within each other while maintaining the dimensional stability of each face frame in and of themselves prior to the injection of the infill core. Two completed interlocking face frames can be placed and held into a separable mold and mold door while securing their position within the mold also by friction fit to the interior surfaces of the mold. The resulting composite infill panel has structural side members at the ship lap sides that also serve as the main component for fastening one panel to an adjacent panel and/or to pre-existing structures when desired. The panel's increased structural values can be attained by the insertion of secondary strut material to the interiors of the primary strut component(s) while being held in position by means of friction or interference fit, puncture-crimp or chemical bond. Once the infill core process has been introduced and expanded, the core itself mechanically locks the face frames with corresponding struts and channels into the completed panel. The principal objectives and advantages of the invention is to provide the building materials industry an affordable superior alternative building panel system that will exceed Title 24 Energy Codes and Uniform Building Codes (UBC) for structural load and shear values. A unique built-in structural fastening component provides ease and simplicity for on-site or prefabricated construction of homes and other buildings while maintaining precise dimensional stability, thermal break and sound attenuation. This lightweight structural system can be easily and rapidly constructed by relatively unskilled labor with minimal tools. A variety of external and internal surfaces can be applied over the panel. The completed panel eliminates the need for plywood attachment over a wall section for racking and shear requirements. This panel system provides a fast and low cost method of increasing the structural values of each strut member of a panel so as to satisfy a greater structural requirement for isolated or concentrated load points and creates a stronger diaphragm action for roof and floor loads and still have a basic stock panel that maintains the same dimensional stability as a panel that has not been additionally reinforced for stronger load values.

BRIEF DESCRIPTION OF FIGURES

The present invention is illustrated with respect to particular preferred embodiments thereof in the accompanying drawings, wherein.

DESCRIPTION OF THE PREFERRED EMBODIMENTS

The present invention as illustrated in FIGS. 1–11 is comprised of an infill core 3 of expanded polystyrene, plastic or other infill material. The primary strut members 5, 6 and primary channel 7 when joined together by friction/interference fit 8, puncture-crimp 14 or chemical bond 17 make up a face frame 4 while there are two face frames 4 contained in one panel. The face frames 4 are offset and facing each other but are not touching one another. The two face frames 4 become joined as one panel by the injection and infill of the common core 3 while contained in an injection mold 15. These structural composite panels are for use in the building industry as roof, wall and floor panel systems and are designed to account for extremely high values in their ratings of structural, insulation, sound attenuation, air infiltration, moisture resistance, vapor barrier, termite resistent, non out gassing, zero flame spread and free from deterioration while remaining lightweight and economical to produce and erect. The shape is generally rectangular however, they can vary in length, width, thickness and can be curved or arched. All strut members 5 6, 13 and channel 7 , and fastener 10 can be of numerous types of material depending upon the criteria called for by the user such as ferrous and nonferrous metals, aluminum, fiberglass/resin, carbon fibers, plastic, wood or silica /glass.

Figure 1:
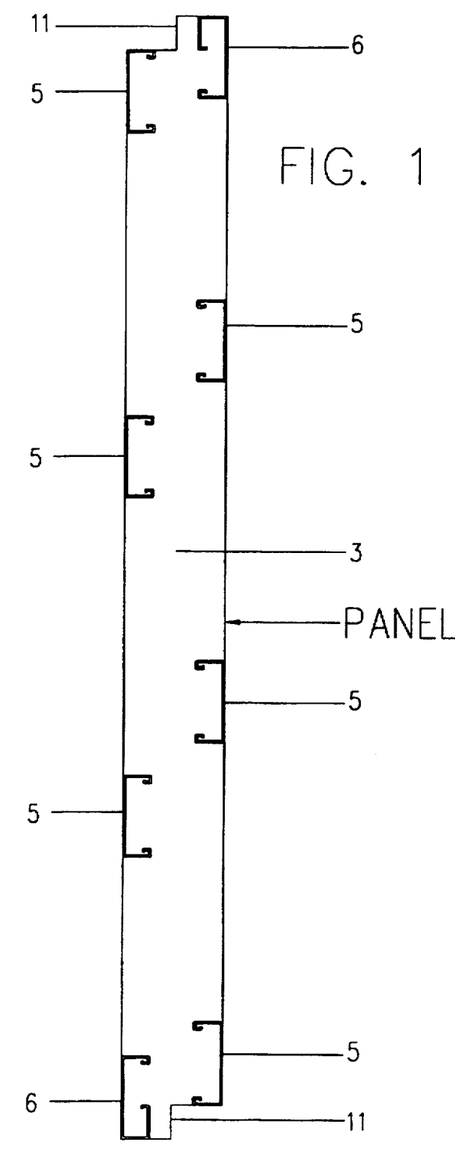
FIG. 1 is a top/bottom end view of a panel wherein the infill core and two primary strut member types are exposed to reveal their respective configurations and locations.
Figure 2:
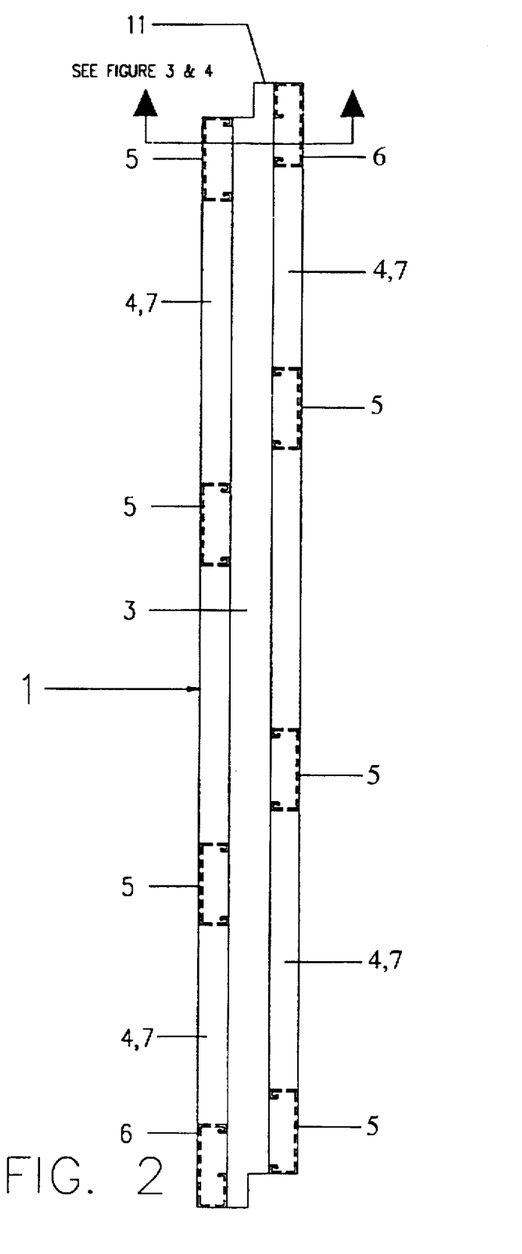
FIG. 2 is a top/bottom end view of a panel wherein the infill core and two primary strut member types are fitted into the primary channel member and thereby capped and secured into any given location and forming two opposing face frames.
Figure 3:
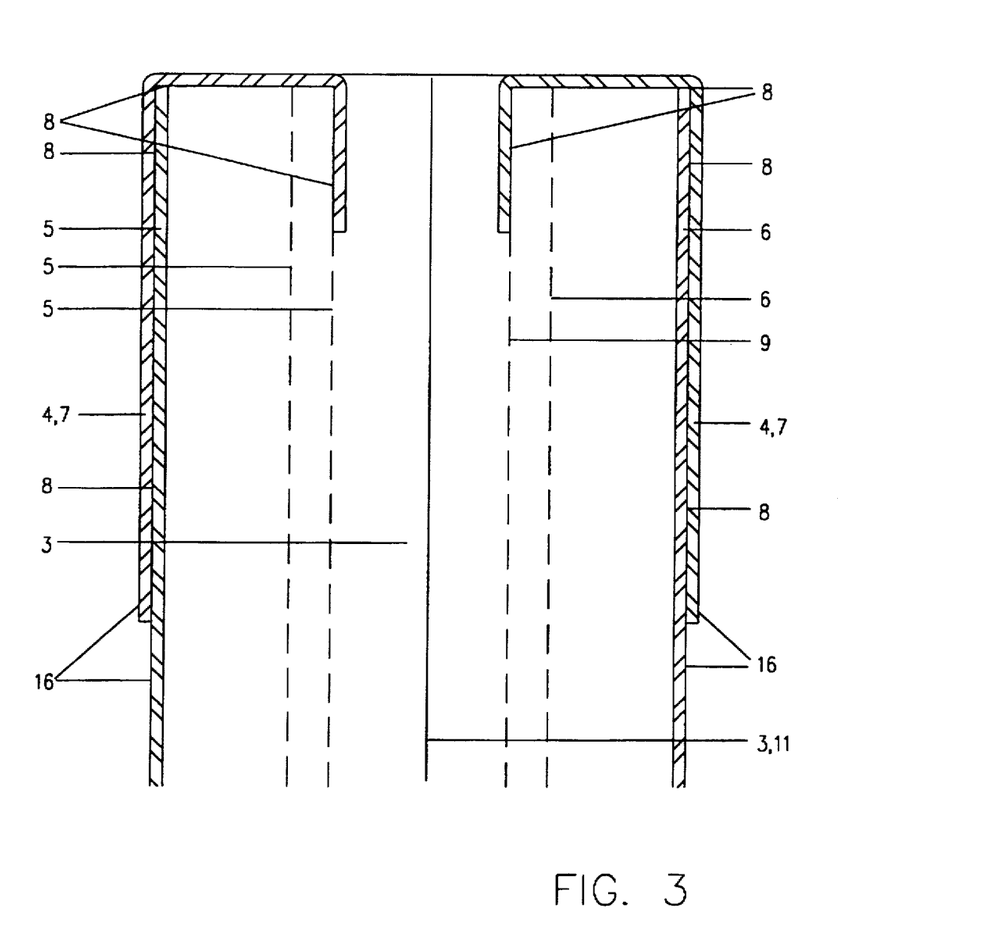
FIG. 3 is a top/bottom vertical side view of a panel wherein the two opposing face frames are exposed to show the primary strut members interlocking within the primary channel members.
Figure 4:
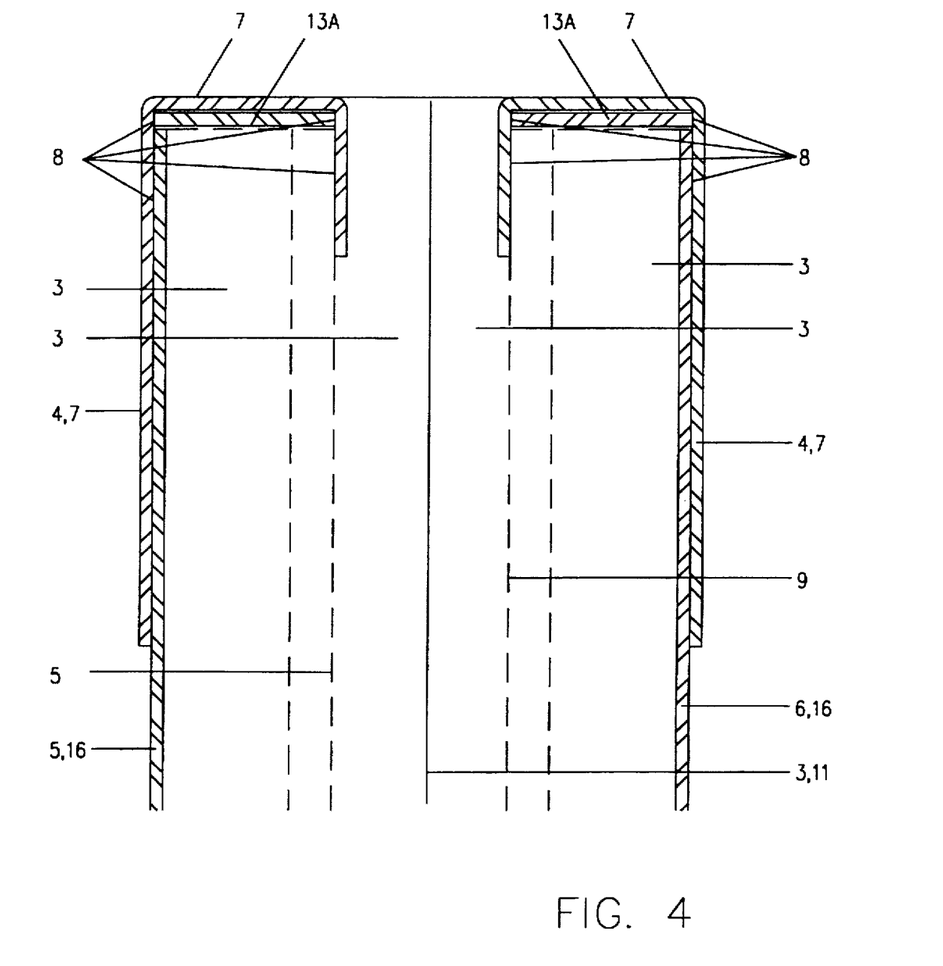
FIG. 4 is a top/bottom vertical side view of a completed panel wherein the two opposing face frames are exposed and show an optional secondary strut members within the interior surfaces of the top/bottom capping primary channel members.

FIG. 1 illustrates a top view of panel 1 with the infill core 3 in full expansion. This view exposes the configurations of two primary strut members 5 and 6 that normally extend in a vertical direction and are each joined at each of their respective ends by inserting and friction fit 8 or interference fit 8 into the common interior sides of primary channel members 7 as shown in FIGS. 2,3 and 4. The two vertical sides or ends of panel 1 have opposite and corresponding ship lap 11 configurations for adjacent panel attachments. The ship lap ends are for forming an air and water tight seal when two panels are joined together. This and following top views are the same as bottom end views.

FIG. 2 illustrates a top end view of panel 1 with the primary channel members 7 capping over primary strut members 5 and 6. Primary strut members 5 has the configuration of the letter "C". Primary strut members 6 has the appearance or configuration of the letter "G". Primary channel members 7 has the appearance or configuration of the letter "J". The "J"or 7 channel serves as a horizontal receptacle for the primary 5 "C" struts and the primary 6 "G" struts at both top and bottom of both their respective ends. The interconnection of the primary struts 5, 6 and primary channels 7 form what is called a face frame 4 while there are two face frames 4 within panel 1.

FIG. 3 illustrates a vertical side view of panel 1 at either the top or bottom with the infill core 3 and the vertical primary strut members 5 and 6 received by the interior sides of primary channels 7 and therefor forming two opposing face frames 4 joined as panel 1 by the infill core 3. Primary channel 7 receives and secures primary struts 5 6 into predetermined positions by means of friction/interference fit 8 at the adjacent points or lines of contact 8.

FIG. 4 illustrates the same vertical side view of panel 1 as illustrated in FIG. 3 with the added secondary strut member 13 A to the interior side of Primary channel member 7. The secondary strut member 13 A is in the form or configuration of a basic flat strap and when installed and held in position by friction/interference fit 8 dramatically raises the allowable load and shear values of the panel system. The infill core 3 process, once completed becomes a permanent lock for both face frames 4 and all primary/secondary structural strut/channel members 5,6,7, and 13 and shown in further FIGS. 8, 9 and 10.

Figure 5:
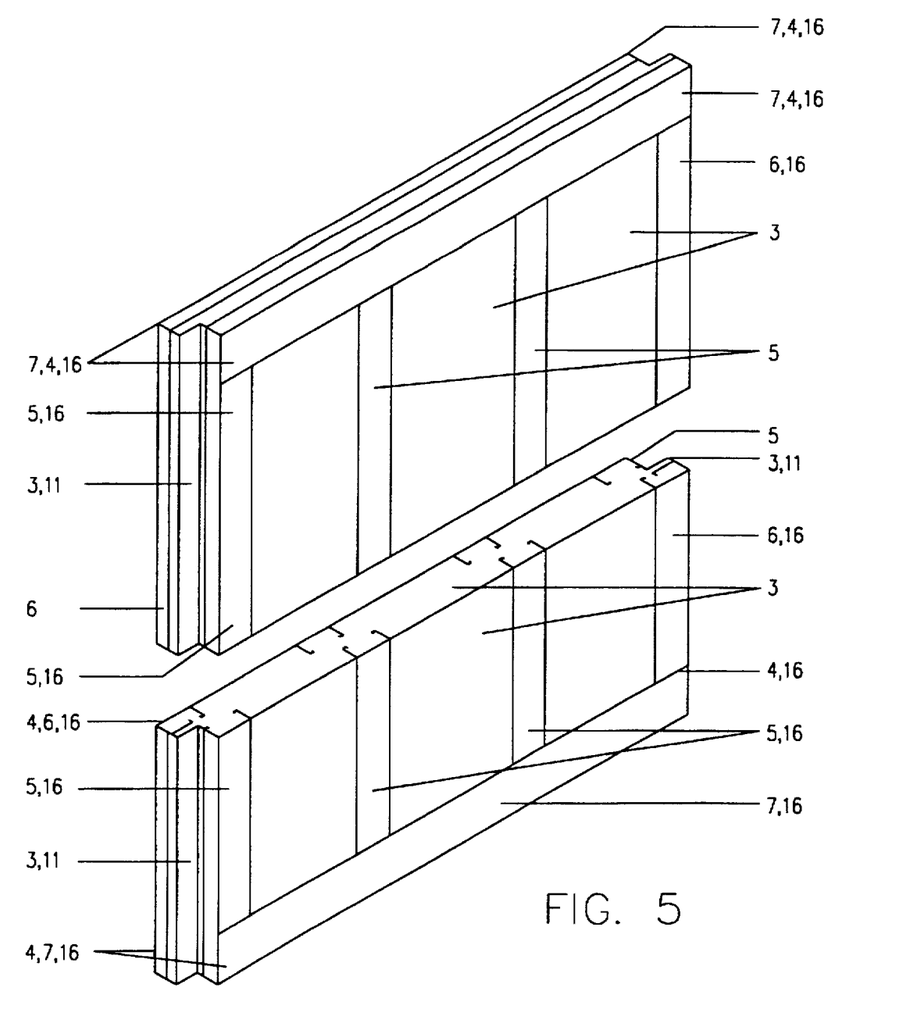
FIG. 5 is an isometric view of a completed panel with the cut and exposed mid section showing an internal view of the primary strut members extending the full vertical length of the panel and primary channel members forming opposing face frames while all joined as one by the infill core. The exposed surface legs of the face frame can also be known as the face legs.

FIG. 5 illustrates an isometric view of completed panel 1 with a cut mid section exposing an internal view of the primary strut members 5, 6 and two opposing face frames 4 while primary channel members 7 cap and receive primary strut members 5 and 6. The completed panel 1 shows the infill core 3 and ship lap ends 11 that will fit and receive an opposing ship lap end 11 of panel 2 for adjacent panel attachments. The exposed legs of the primary struts 5, 6, and primary channels 7 while forming a face frame 4 are known as the face legs 16.

Figure 6:
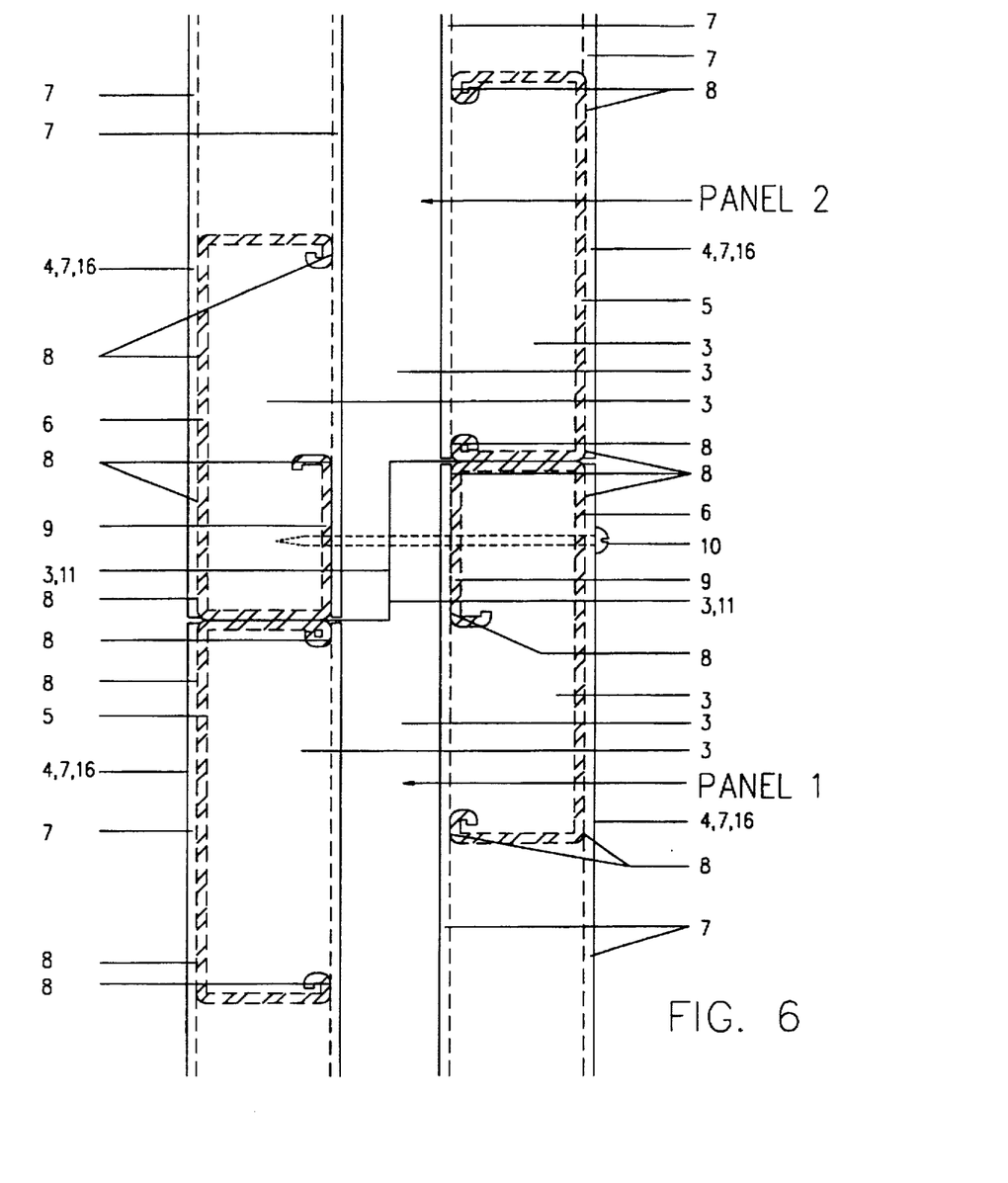
FIG. 6 is a top/bottom end view of a panel to panel attachment with a fastener structurally and mechanically joining the panels at the ship lap joint.

FIG. 6 illustrates a top view of the union of panel 1 and panel 2 at the ship lap joint 11. The panel to panel attachment is made by the insertion and penetration of a fastener 10 through the exposed face leg 16 of primary channel member 7, primary strut 6, the infill core 3 of panel 1, continuing through the interior leg 9 of primary strut member 6 of panel 1, continuing through the infill core 3 of panel 1 at the common and adjacent ship lap joints 11 with panel 2 and into core 3 of panel 2 and piercing the interior leg 9 of primary strut member 6 of panel 2 and thereby structurally securing the two separate panels 1 and 2 together in a firm and positive structural manner. Fastener 10 can also be applied from any exposed face leg 16 and at any point along the exposed face leg 16 of face frame 4.

Figure 7:
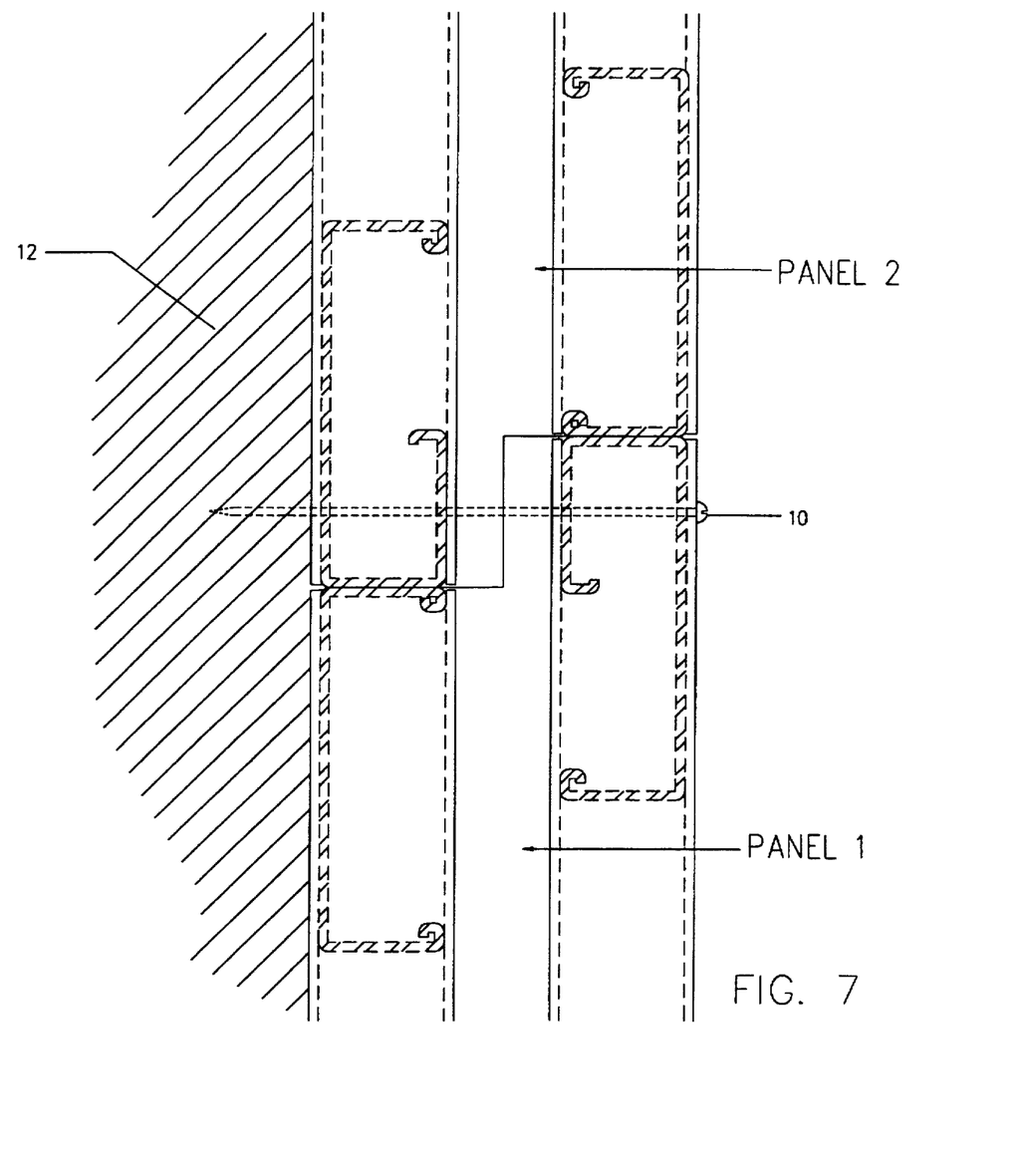
FIG. 7 is the identical view as FIG. 6 with the one exception of a longer fastener being applied to mount both adjacent panels to an existing surface or framework grid.

FIG. 7 illustrates an identical view as in FIG. 6 with the exception of a longer fastener 10 extended into a pre-existing grid or framework 12. As in FIG. 6, fastener 10 can be applied at any point along the exposed face legs 16 of the exposed surface face legs 16 of face frame 4. Fastener 10 is generally composed of a number and gauge 15 size sheet metal screw but would change in material depending upon the different materials used for primary and secondary struts 5, 6, 13 and primary channels 7.

Figure 8:
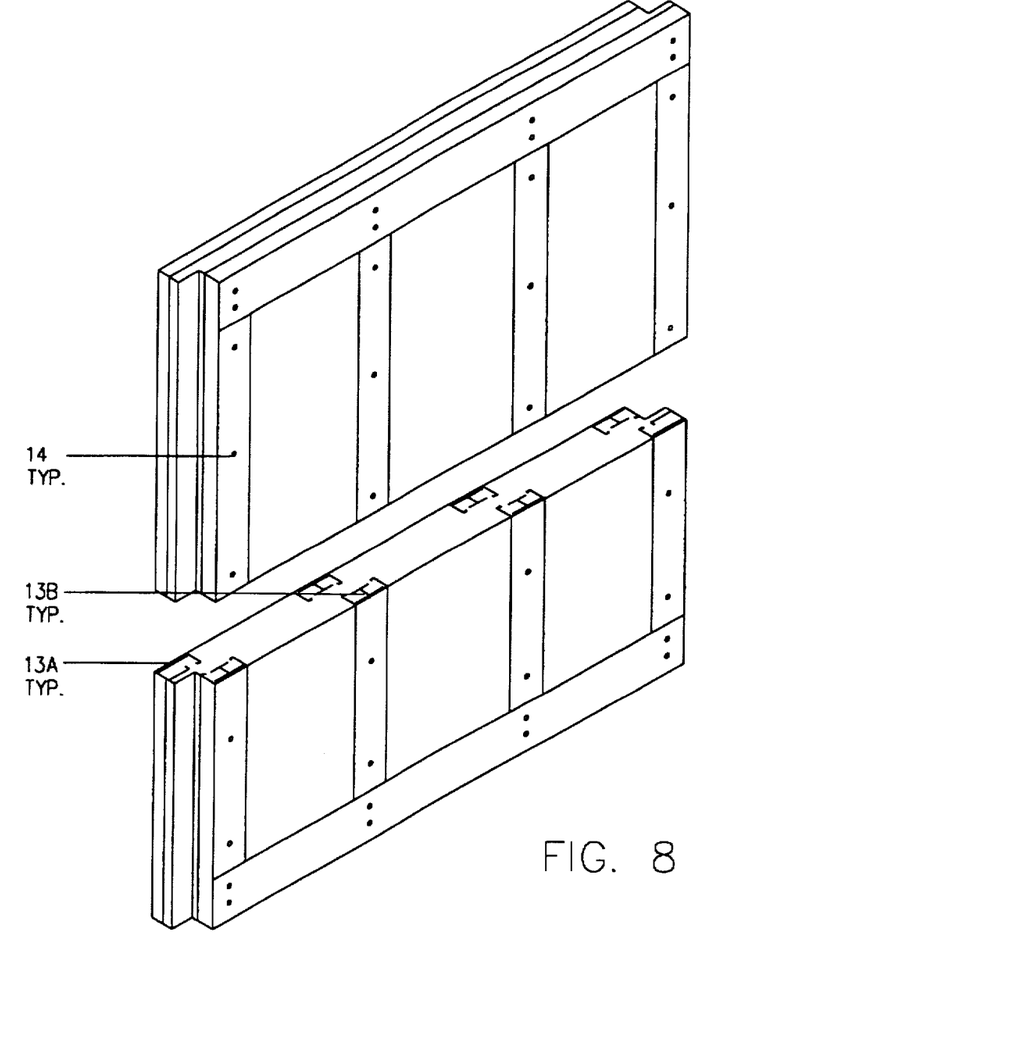
FIG. 8 is an isometric view of a completed panel with the mid section exposed for view of the internal primary strut members having been added to by optional secondary strut members.

FIG. 8 illustrates an isometric view of panel 1 and an isometric cut mid section to show the internal configurations of primary strut members 5 and 6 capped by primary channel members 7 at the top and bottom of panel 1 to form two opposing and offset face frames 4. The additional secondary strut member 13 A and/or 13 B can be placed to the interior sides of primary strut members 5, 6 and primary channels 7 by means of friction/interference fit 8, puncture-crimp 14 prior to the infill core 3 process so as to dramatically increase the allowable structural load values of panel 1 as needed.

Figure 9:
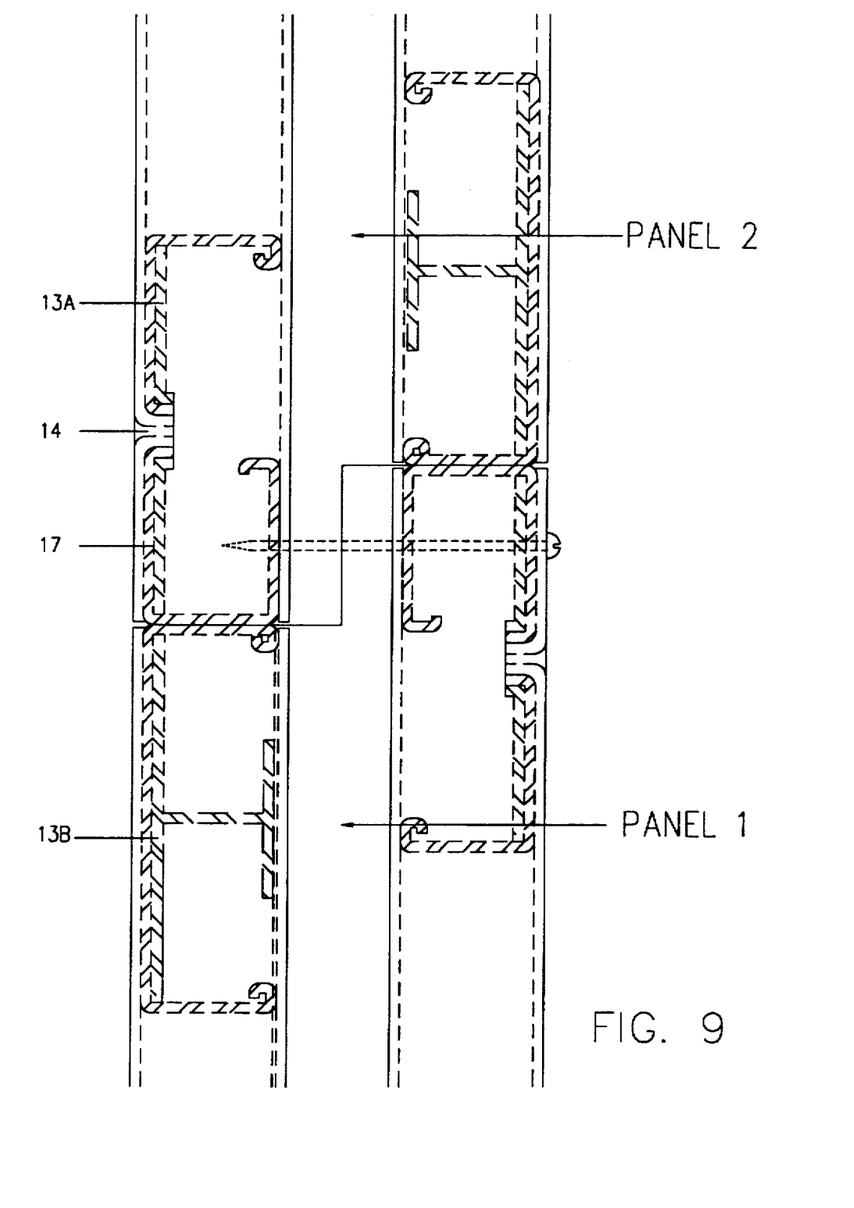
FIG. 9 is a top/bottom end view of a panel wherein the ship lap joint of two adjacent panels is joined together with a fastener while the interior face sides of the primary strut and primary channel members are assisted by secondary strut members.

FIG. 9 illustrates the insertion and attachment of secondary strut members 13 A and 13 B. This is achieved by placing secondary strut members 13 to the interior sides of primary strut members 5, 6 and primary channel 7. Secondary strut members 13 A or 13 B in the form of a flat strap and 13 B is in the shape or configuration of the letter "T" or "H" and both are secured into position by friction/interference fit 8, puncture-crimps 14 or chemical bonding 17 when certain strut materials require that application such as plastics, fiberglass/resins or silica/glass. All 3 methods of attachments 8,14 and 17 are shown in FIG 9 for illustrative purposes only.

Figure 10:
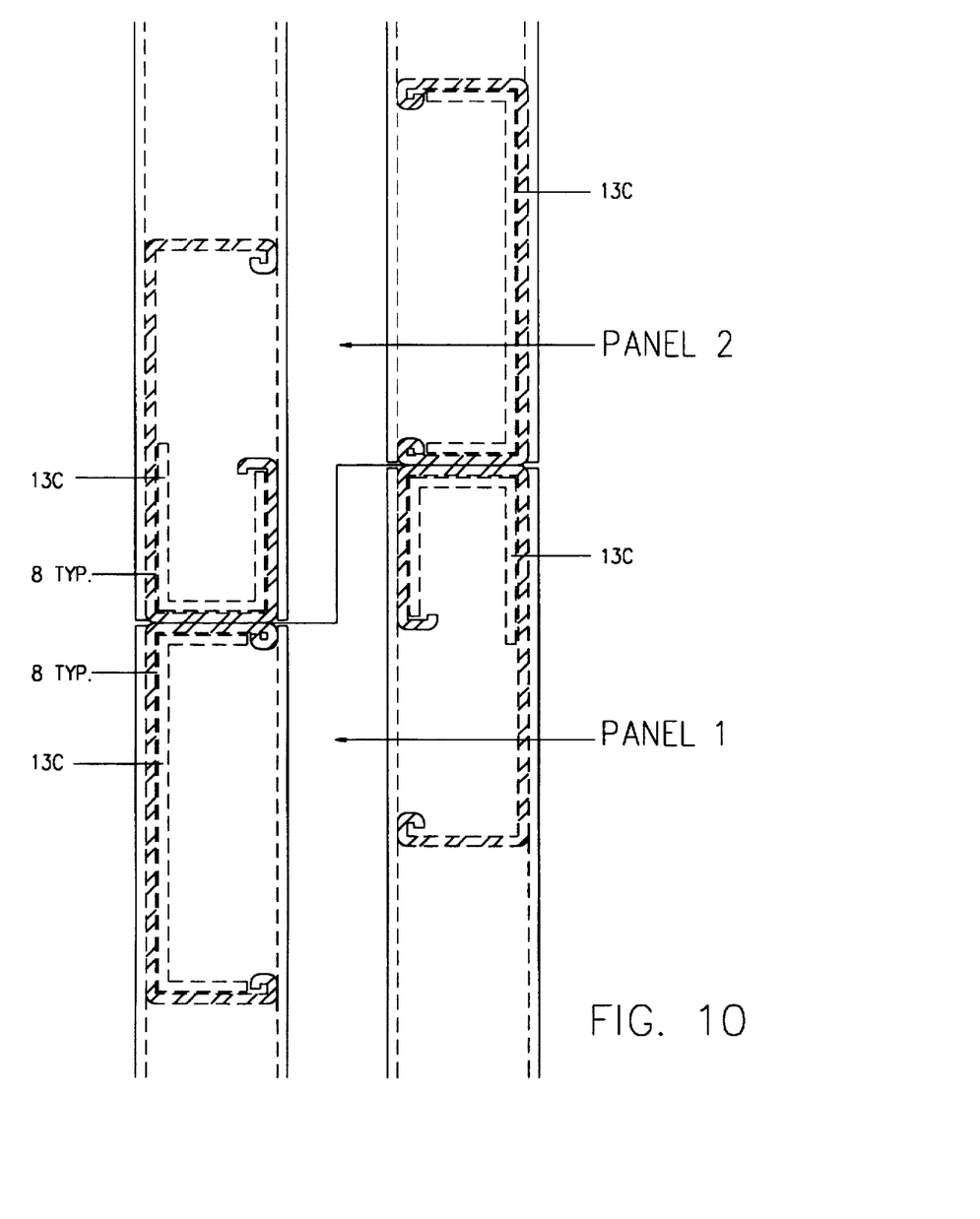
FIG. 10 is a top/bottom end view of two adjacent panels wherein the internal surfaces of the primary strut members are assisted by the additional secondary strut members.

FIG. 10 illustrates inserted optional secondary strut members 13 C to the interior surfaces of primary strut members 5 and 6 in both panels 1 and 2. Secondary strut members 13 C are in the shape or configuration of the letter "U". Firm and positive positioning of secondary members 13 C is achieved again most commonly by friction/ interference fit 8 at common adjacent surfaces with primary strut members 5 and 6, puncture-crimp 14 or chemical bonding 17 when certain materials are used for strut members 5, 6, 7 and 13. The addition of secondary strut member 13 C to primary strut members 5, 6, and primary channel 7 is to satisfy the greater demand for allowable loads to roofs, floors, and walls.

Figure 11:
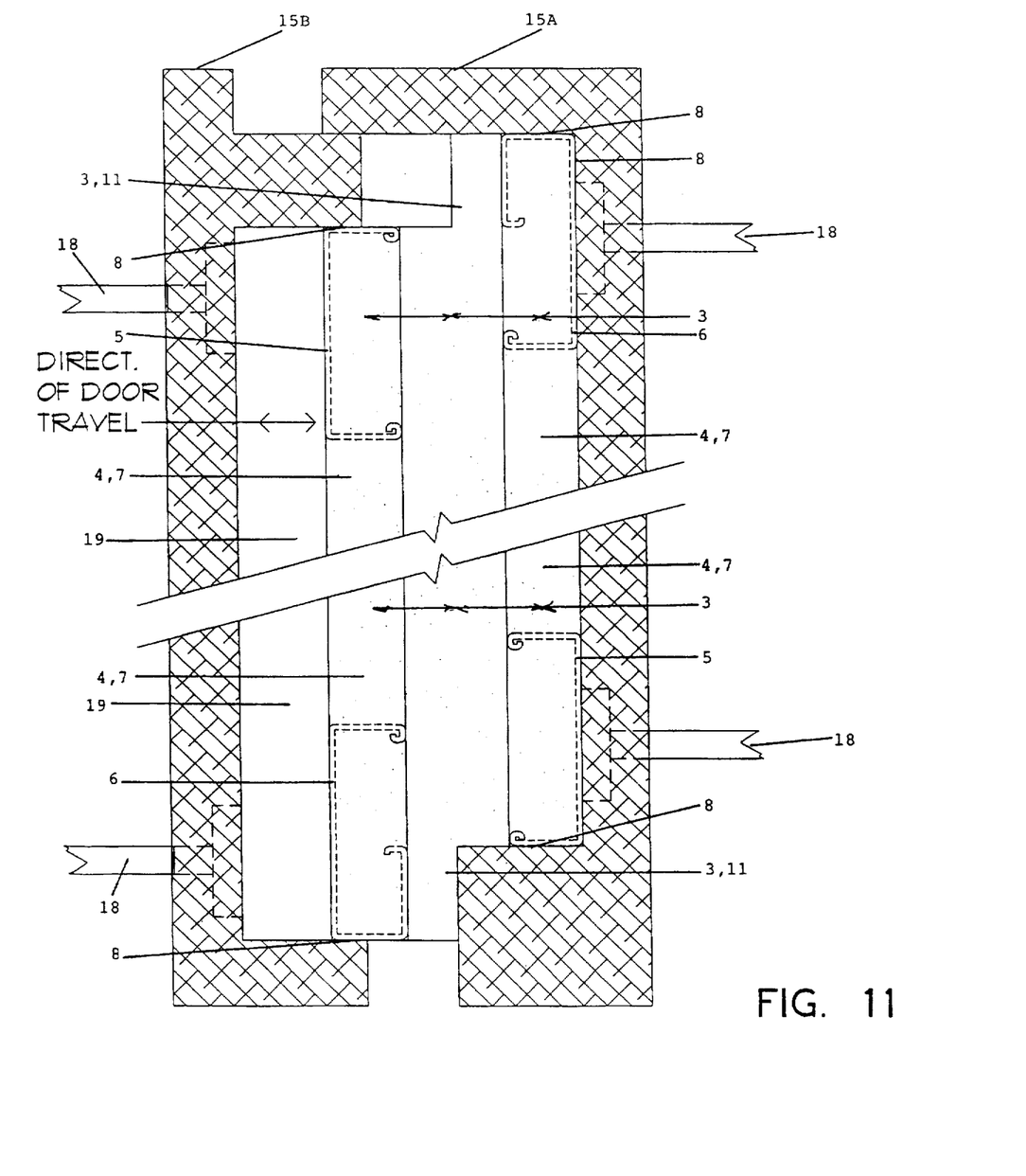
FIG. 11 is a exposed end view of the injection mold and separable door, a panel within, two offsetting face frames containing primary struts and primary channels, the completed infill core and knock out rams for panel extraction.

FIG. 11 illustrates an exposed end view of a typical block mold 15 and a separable opening door 15 A with a completed panel 1 within the interior of the mold 15 with the infill core 3 and showing the two separated face frames 4 together with the primary strut members 5, 6, and primary channel 7. Two face frames 4 are placed separately into the mold 15 and door 15 A while secured into position by friction fit /interference fit 8 at all lines or points of contact 8 between the outside edges of face frames 4 and the inside surfaces of the injection mold 15 and door 15 A. The infill core 3 process permanently locks any and all internal primary and secondary strut components 5, 6, 7 and 13 and two face frames 4. The completed panel 1 is extracted from mold 15 and mold door 15 A by means of knockout rams 18 mounted to the internal surfaces of the mold 15 and 15 A. Optional means of extracting panel 1 include to introduce high pressure amounts 19 of water or air between the interior surface of the mold and the exterior surface of the completed panel.

While I have illustrated and described several embodiments of my invention, it will be understood that these are by way of illustration and that various changes may be contemplated in my invention within the scope of the following claims.

What is claimed is:

1. A method of making a composite structural building panel comprising:

a. placing at least one J-shaped structural channel member within a mold to receive and temporarily hold added structural strut members;

b. placing at least one structural strut member from the group comprising, a G-shaped structural strut member, a C-shaped structural strut member, and an H-shaped structural strut member, within said mold generally perpendicular to and fitted to the inside surfaces of said J-shaped structural channel member; and c. injecting an in-fill core material into said mold that surrounds the majority of surfaces of all said structural strut members and all said structural channel members thereby permanently interlocking all said structural members into one composite structural panel.

2. The method of claim 1 wherein a temporary holding force is achieved by way of frictional engagememt or puncture crimp between the opposing and abutting surfaces of the at least one structural strut member and inside surfaces of said J-shaped structural strut member prior to placememt within said mold.

3. The method of claim 1 wherein step c is performed by single stage process of injection in-fill into said mold.

4. The method of claim 1 wherein said at least one structural strut member is a G-shaped structural strut member which serves as an attachment mechanism for connecting adjacent composite structural panels while maintaining a thermal break within the interior of said composite structural panel.

5. The method of claim 1 wherein said at least one structural strut member is an H-shaped structural strut member which serves as an attachment mechanism for connecting adjacent composite structural panels while maintaining a thermal break within the interior of said composite structural panel.

* * * * *